United States Patent
Igarashi et al.

(10) Patent No.: US 9,646,190 B2
(45) Date of Patent: May 9, 2017

(54) TWO-DIMENSIONAL CODE READING DEVICE

(71) Applicant: MITSUBISHI ELECTRIC CORPORATION, Tokyo (JP)

(72) Inventors: Fumio Igarashi, Tokyo (JP); Seiji Okumura, Tokyo (JP); Kenjiro Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/035,281

(22) PCT Filed: Dec. 17, 2014

(86) PCT No.: PCT/JP2014/006285
§ 371 (c)(1),
(2) Date: May 9, 2016

(87) PCT Pub. No.: WO2015/098046
PCT Pub. Date: Jul. 2, 2015

(65) Prior Publication Data
US 2016/0292481 A1    Oct. 6, 2016

(30) Foreign Application Priority Data

Dec. 27, 2013    (JP) .................................. 2013-270892

(51) Int. Cl.
*G02B 26/10* (2006.01)
*G06K 7/10* (2006.01)
(Continued)

(52) U.S. Cl.
CPC ....... *G06K 7/1417* (2013.01); *G06K 7/10722* (2013.01); *G06K 7/10732* (2013.01);
(Continued)

(58) Field of Classification Search
USPC ......... 235/454, 455, 462.06, 462.26, 462.24, 235/462.41, 462.42, 462.45, 472.01
See application file for complete search history.

(56) References Cited

U.S. PATENT DOCUMENTS 4,816,858 A * 3/1989 Watanabe ................ G02B 7/28
                                                                    396/96
5,678,102 A * 10/1997 Chamberlain, IV ... G03B 17/48
                                                                    348/64

(Continued)

FOREIGN PATENT DOCUMENTS

JP    2002-304594 A    10/2002
JP    2003-132301 A    5/2003
(Continued)

*Primary Examiner* — Tuyen K Vo
(74) *Attorney, Agent, or Firm* — Birch, Stewart, Kolasch & Birch, LLP

(57) ABSTRACT

A two-dimensional code reading device which can prolong the lifetime of the auxiliary light is provided. A two-dimensional code reading device in the present invention includes an image reading unit to acquire an image of a two-dimensional code printed on a ticket medium, a specific pattern detector to detect a specific pattern to identify the two-dimensional code from the image of the two-dimensional code acquired by the image reading unit, a two-dimensional code decoder to read information recorded in the two-dimensional code detected by the specific pattern detector, an auxiliary light to irradiate light on the ticket medium and an auxiliary light controller to control turning on and off of the auxiliary light, wherein the auxiliary light controller turns on the auxiliary light when the specific pattern is detected by the specific pattern detector and the information recorded in the two-dimensional code cannot be read by the two-dimensional code decoder.

2 Claims, 3 Drawing Sheets

(51) Int. Cl.
*G06K 9/22* (2006.01)
*G06K 7/14* (2006.01)
*G06K 19/06* (2006.01)

(52) U.S. Cl.
CPC ....... *G06K 7/10752* (2013.01); *G06K 7/1439* (2013.01); *G06K 19/06037* (2013.01)

(56) References Cited

U.S. PATENT DOCUMENTS

| | | | | |
|---|---|---|---|---|
| 9,438,811 | B2* | 9/2016 | Okuno | H04N 5/2351 |
| 2001/0035944 | A1* | 11/2001 | Sunagawa | B41J 2/465 |
| | | | | 355/67 |
| 2003/0021612 | A1* | 1/2003 | Morikawa | G03G 5/147 |
| | | | | 399/159 |
| 2003/0179311 | A1* | 9/2003 | Shiga | H04N 5/23212 |
| | | | | 348/370 |
| 2004/0232236 | A1* | 11/2004 | Wilde | G06K 7/10881 |
| | | | | 235/454 |
| 2009/0140047 | A1* | 6/2009 | Yu | G06K 7/10732 |
| | | | | 235/462.26 |
| 2009/0194594 | A1* | 8/2009 | Laser | G06K 7/12 |
| | | | | 235/462.42 |
| 2009/0256938 | A1* | 10/2009 | Bechtel | H04N 5/374 |
| | | | | 348/302 |
| 2012/0236315 | A1* | 9/2012 | Levy | G01B 9/02004 |
| | | | | 356/491 |
| 2016/0034737 | A1* | 2/2016 | Goren | G06K 7/146 |
| | | | | 235/455 |

FOREIGN PATENT DOCUMENTS

| | | |
|---|---|---|
| JP | 2004-30014 A | 1/2004 |
| JP | 2006-81087 A | 3/2006 |
| JP | 2011-113308 A | 6/2011 |
| JP | 2011-243223 A | 12/2011 |

* cited by examiner

TWO-DIMENSIONAL CODE READING DEVICE

TECHNICAL FIELDS

The present invention relates to a two-dimensional code reading device which turns on an auxiliary light when reading a two-dimensional code.

BACKGROUND ART

A conventional two-dimensional code reading device includes a reading area over which a ticket medium with a two-dimensional code printed thereon is held, a light emitting surface which makes the reading area emit light, and dedicated sensors (approach sensors) arranged at four corners of the reading area to detect an approach of the ticket medium. With the approach sensors, the conventional two-dimensional code reading device detects that a ticket medium is held over its reading area and irradiates light on the ticket medium (for example, Patent Document 1).

PRIOR ART REFERENCE

Patent Document

Patent Document 1: Japanese Patent Publication No. 5214780

SUMMARY OF INVENTION

Problem to be Solved by the Invention

The conventional two-dimensional code reading device, however, has a problem that the lifetime of the auxiliary light is shortened because it erroneously detects a ticket medium being held over and turns on the auxiliary light, upon approach of something other than a ticket medium with a two-dimensional code printed thereon, for example a hand.

The present invention is made to solve the problem described above and to provide a two-dimensional code reading device that can prolong the lifetime of the auxiliary light by preventing an erroneous detection from being caused by an approach of medium other than a ticket medium with a two-dimensional code printed thereon.

Means for Solving the Problems

A two-dimensional code reading device in the present invention includes an image reading unit to acquire an image of a two-dimensional code printed on a ticket medium, a specific pattern detector to detect a specific pattern to identify the two-dimensional code from the image of the two-dimensional code acquired by the image reading unit, a two-dimensional code decoder to read information recorded in the two-dimensional code detected by the specific pattern detector, an auxiliary light to irradiate light on the ticket medium and an auxiliary light controller to control turning on and off of the auxiliary light, wherein the auxiliary light controller turns on the auxiliary light when the specific pattern is detected by the specific pattern detector and the information recorded in the two-dimensional code cannot be read by the two-dimensional code decoder, the image of the two-dimensional code acquired by the image reading unit is an image taken by a camera which adjusts the brightness of the image by automatically controlling an exposure time or a gain, and the auxiliary light controller does not turn on the auxiliary light regardless of a detection result of the specific pattern detector and a reading result of the two-dimensional code decoder, when the exposure time with which the camera takes the image is shorter than a predetermined threshold value of the exposure time, or when the gain with which the camera takes the image is smaller than a predetermined threshold value of the gain.

Effect of the Invention

Because the two-dimensional code reading device of the present invention images a two-dimensional code printed on a ticket medium, detects a specific pattern from the two-dimensional code, and turns on the auxiliary light when the information recorded in the two-dimensional code cannot be read, it can prevent an erroneous detection from being caused by an approach of a medium other than a ticket medium with a two-dimensional code printed thereon, and therefore can prolong the lifetime of the auxiliary light.

EMBODIMENTS FOR CARRYING OUT THE INVENTION

Embodiment 1

Hereinafter, a two-dimensional code reading device according to Embodiment 1 will be explained using FIG. 1 to FIG. 5.

Figure 1:
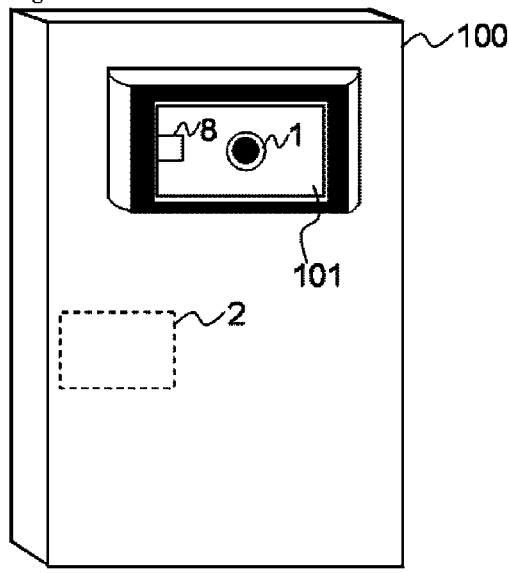
FIG. 1 is a perspective view of a card reader including a two-dimensional code reading device according to Embodiment 1.
Figure 2:
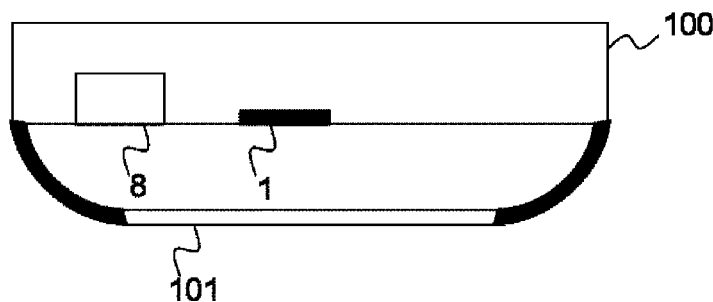
FIG. 2 is a cross sectional view of a card reader with the two-dimensional code reading device in Embodiment 1.

Firstly, using FIG. 1, a card reader with a two-dimensional code reading device in Embodiment 1 will be explained. FIG. 1 is a perspective view of a card reader with a two-dimensional code reading device in Embodiment 1. The card reader 100 includes a camera 1, the two-dimensional code reading device 2, and an auxiliary light 8. As shown in FIG. 2, when a ticket medium with a two-dimensional code printed thereon is held over a glass window 101 arranged in front of the card reader 100, the card reader 100 controls the camera 1 to read the information recorded in the two-dimensional code. The card reader 100 is used, for example, in a room access management system and so forth. In such a case, an admission card, etc. corresponds to a ticket medium. Here, a two-dimensional code means a code which has information both in a horizontal direction and in a vertical direction.

The camera 1 takes images of the two-dimensional code printed on a ticket medium at a predetermined time interval. For the camera 1, for example, a camera such as a CMOS (Complementary Metal-Oxide Semiconductor) camera and a CCD (Charge Coupled Devices) camera are used.

Also, the camera 1 controls the exposure time and the gain automatically when it takes an image of a two-dimensional code in accordance with the brightness of the surrounding environment. The exposure time is the time during which an imaging device of the camera 1 is exposed to the light through the lens. The gain is a degree of amplification with which the imaging device converts light to electric signals. The camera 1 can take a bright image even in a dark surrounding environment by lengthening the exposure time and increasing the gain. In other words, the lengthened exposure time and the increased gain set automatically by the camera 1 mean that the surrounding environment is dark.

The auxiliary light 8 irradiates light on the ticket medium held over the glass window 101. An LED (Light Emitting Diode), for example, is used for the assisting light 8.

The two-dimensional code reading device 2 is connected with the camera 1 and the auxiliary light 8 in the card reader 100, and controls the camera 1 and the auxiliary light 8.

Figure 3:
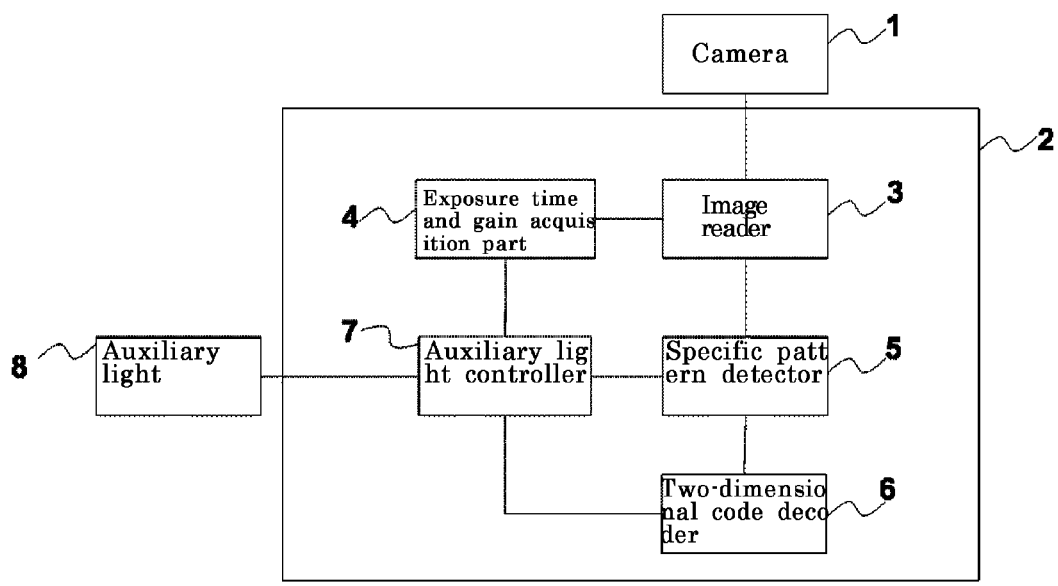
FIG. 3 is a diagram which shows a configuration of the two-dimensional code reading device in Embodiment 1.

Next, using FIG. 3, the configuration of the two-dimensional code reading device 2 will be explained in detail. FIG. 3 is a diagram which shows a configuration of the two-dimensional code reading device 2 in Embodiment 1.

In FIG. 3, the two-dimensional code reading device 2 includes the image reading unit 3, the exposure time and gain acquisition unit 4, the specific pattern detector 5, the two-dimensional code decoder 6, and an auxiliary light controller 7. The image reading unit 3, the exposure time and gain acquisition unit 4, the specific pattern detector 5, the two-dimensional code decoder 6, and the auxiliary light controller 7 are connected and able to exchange information.

The image reading unit 3 acquires images of the two-dimensional code taken by the camera 1.

If the specific pattern detector 5 identifies a characteristic shape (a specific pattern) of a two-dimensional code in the camera images acquired by the image reading unit 3, it determines that a two-dimensional code exists at that position.

Figure 4:
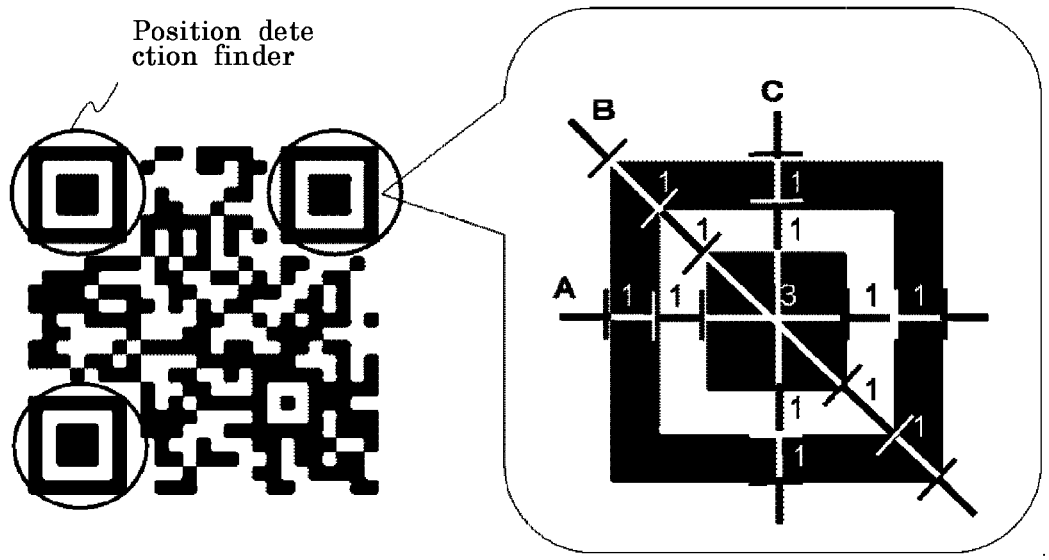
FIG. 4 is a diagram which explains a method of detecting a specific pattern.

Here, a specific pattern means a characteristic shape which, arranged in a two-dimensional code, is identifiable even in a surrounding environment not bright enough. An example of the specific pattern is the position-detection finder (FIG. 4) of QR Code (Registered Trade Mark) (Quick Response Code) which is an example of the two-dimensional code. QR Code (Registered Trade Mark) has three position-detection finders at its three corners. When the two-dimensional code reading device 2 reads the information recorded in the QR Code (Registered Trade Mark), the position of the QR Code (Registered Trade Mark) can be detected by searching for the specific pattern first. In the position-detection finder, as shown in FIG. 4, the ratios of the length of the portions of the black and white on each of the lines A, B and C (i.e. B:W:B:W:B) are arranged to be 1:1:3:1:1. The specific pattern detector 5 recognizes the position-detection finder by detecting the ratios. Also, the specific pattern detector 5 can determine that a QR Code (Registered Trade Mark) exists at the position where it detects three position-detection finders within a certain area.

In the present embodiment, the two-dimensional code was explained taking an example of QR Code (Registered Trade Mark). But not limited to this, any two-dimensional code which has a specific pattern, such as Micro QR Code (Registered Trade Mark), can be used.

Also, the two-dimensional code type is not limited to a two-dimensional code. A one-dimensional bar code and any other type of data symbol can be used if it is a symbol which has a specific pattern.

The two-dimensional code decoder 6 reads the information recorded in the two-dimensional code which exists at the position where the specific pattern detector 5 has determined a two-dimensional code to exist. The information recorded in a two-dimensional code, for example, is personal information, etc. of a visitor.

The exposure time and gain acquisition unit 4, acquiring information on the exposure time and the gain from the camera 1, instructs the auxiliary light controller 7 to turn on or off the auxiliary light 8.

The auxiliary light controller 7 controls the turning on or off of the auxiliary light 8 in accordance with the information on the exposure time and the gain acquired by the exposure time and gain acquisition unit 4, with the detection result detected by the specific pattern detector 5, and with the reading result of the two-dimensional code decoder 6.

Figure 5:
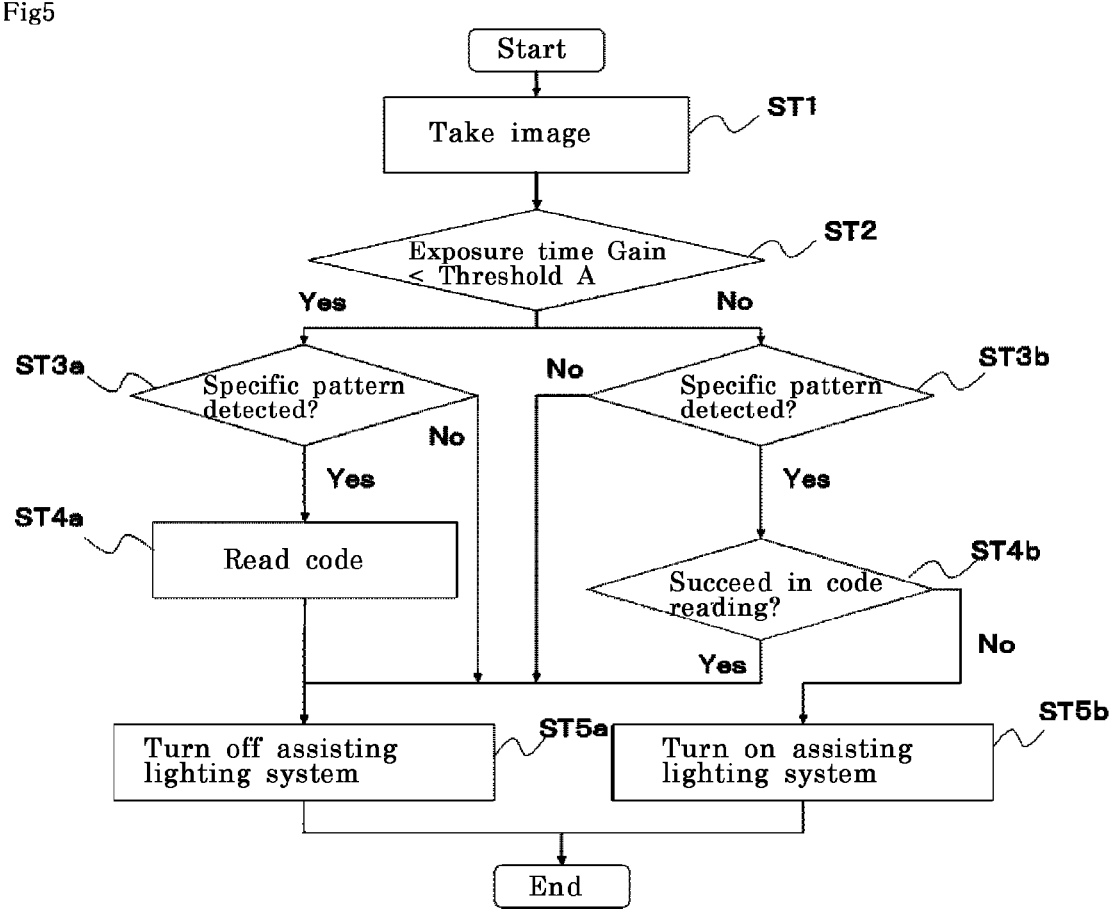
FIG. 5 is a flowchart which shows the operation of the two-dimensional code reading device in Embodiment 1.

Next, using FIG. 5, the operation of the two-dimensional code reading device in Embodiment 1 will be explained. FIG. 5 is a flowchart which shows the operation of the two-dimensional code reading device in Embodiment 1.

In ST1, the camera 1 takes an image. Images are taken at a predetermined time interval regardless of the presence or absence of a two-dimensional code. In the following explanation, out of the images taken at a predetermined interval, images including a two-dimensional code will be explained as an example. The camera 1 controls the exposure time and the gain automatically in taking an image of a two-dimensional code. Note that the auxiliary light 8 is supposed to be off in ST1.

In ST2, the image reading unit 3 receives image information on the two-dimensional code from the camera 1. The image reading unit 3 also receives, from the camera 1, information on the exposure time and the gain in taking the received image, and outputs the information on the exposure time and the gain to the exposure time and gain acquisition unit 4. The exposure time and gain acquisition unit 4 may acquire the information on the exposure time and the gain directly from the camera 1.

Further, if the information on the exposure time and the gain received from the image reading unit 3 is smaller than the predetermined threshold A of exposure time and gain (for example, the exposure time is 128 and the gain is 0), the exposure time and gain acquisition unit 4 determines that the surrounding environment is bright enough to satisfactorily read the two-dimensional code without turning on the auxiliary light 8. In this case, the exposure time and gain acquisition unit 4 instructs the auxiliary light controller 7 not to turn on the auxiliary light 8. Subsequently, the two-dimensional code reading device 2 executes ST3a without turning on the auxiliary light 8.

The threshold A is set in accordance with the brightness of the surrounding environment such that the information recorded in the two-dimensional code can be read. Also, the threshold A may be individually set for the exposure time and the gain, or set for only one of the exposure time and the gain.

In ST3a, the specific pattern detector 5 detects a specific pattern which indicates existence of a two-dimensional code from the image acquired by the image reading unit 3 in ST1. If the specific pattern detector 5 cannot detect the specific pattern, the flow proceeds to ST5a to end the operation with the auxiliary light 8 kept off. If the specific pattern detector 5 has detected a specific pattern, it makes the two-dimensional code decoder 6 execute the operation ST4a.

In ST4a, the two-dimensional code decoder 6 reads the information recorded in the two-dimensional code. When the two-dimensional code reading device 2 has finished the reading, the flow proceeds to ST5a to end the operation with the auxiliary light 8 kept off.

As explained above, when the exposure time is shorter or the gain is smaller than the threshold A, the two-dimensional code reading device 2 according to the present embodiment determines that the surrounding environment is bright enough, and will not turn on the auxiliary light 8 regardless of the detection result of the specific pattern and the reading result of a two-dimensional code. This leads, therefore, to the prolonged lifetime of the auxiliary light.

On the other hand, in ST2, when the exposure time and gain acquisition unit 4 has determined that the information on the exposure time and the gain, received from the image reading unit 3, is equal to or larger than the predetermined threshold A on the exposure time and the gain, it judges that the surrounding environment is dark and the auxiliary light 8 may be needed, and then outputs the result to the auxiliary light controller 7.

In ST3b, the specific pattern detector 5 detects a specific pattern which indicates existence of a two-dimensional code from the image which the image reading unit 3 has read. If the specific pattern detector 5 cannot detect a specific pattern, it determines that the ticket medium held over is not a two-dimensional code, and the flow proceeds to ST5a, and the operation of the two-dimensional code reading device 2 ends with the auxiliary light 8 kept off. On the other hand, if a specific pattern is detected, the operation in ST4b is executed.

In ST4b, the two-dimensional code decoder 6 reads the information recorded in the two-dimensional code. If the two-dimensional code reading device 2 has been able to read the information recorded in a two-dimensional code, the flow proceeds to ST5a to end the operation with the auxiliary light 8 kept off. On the other hand, if the two-dimensional code decoder 6 cannot read the information recorded in the two-dimensional code from the image which was taken by the camera 1 in ST1 at low surrounding illuminance, the flow proceeds to ST5b.

In ST5b, the auxiliary light controller 7 receives information from the two-dimensional code decoder 6 indicating that it has not been able to read the two-dimensional code, and then turns on the auxiliary light 8.

As explained above, because the auxiliary light controller 7 uses the fact that the specific pattern detector 5 has detected a specific pattern as the condition to turn on the auxiliary light 8, the auxiliary light 8 can be prevented from being turned on in vain by an approach, etc. of something other than a two-dimensional code, such as a hand.

The auxiliary light controller 7 is configured to turn on the auxiliary light 8 when the specific pattern detector 5 detects a specific pattern and also the two-dimensional code decoder 6 has not been able to read the information recorded in the two-dimensional code. Therefore, when the two-dimensional code decoder 6 is able to read the information recorded in the two-dimensional code even in a case where the surrounding environment is determined, by the exposure time and gain acquisition unit 4, as dark (the exposure time or the gain is equal to or larger than the threshold), the operation ends with the auxiliary light 8 kept off. As a result of this, the auxiliary light 8 can be prevented from being turned on unnecessarily, so that the lifetime of the lighting system can be prolonged.

When the auxiliary light 8 is turned on in ST5b, the two-dimensional code reading device 2 takes an image of the two-dimensional code again by the camera 1 with the auxiliary light 8 kept on, and then, executes detecting of a specific pattern and reading of the two-dimensional code.

It has been explained that, in the operation of the two-dimensional code reading device 2 in Embodiment 1, the exposure time and gain acquisition unit 4 instructs the auxiliary light controller 7 to turn on the light in accordance with the exposure time and the gain applied when the image reading unit 3 has taken an image of a two-dimensional code. However, when the decision on whether to turn on or off the auxiliary light 8 cannot be made from the exposure time and the gain because the values of the exposure time and the gain have reached their maximums due to the darkness of the surrounding environment, the decision can be made by calculating the average luminance from the image read by the image reading unit 3 and comparing it with a predetermined threshold on the average luminance.

As explained above, the two-dimensional code reading device 2 in Embodiment 1 takes an image of the two-dimensional code printed on a ticket medium. When a specific pattern is detected from the image of the two-dimensional code and also the information recorded in the two-dimensional code cannot be read, then it turns on the auxiliary light. Therefore, an erroneous detection can be prevented from being caused by an approach of something other than a ticket medium with a two-dimensional code printed thereon. This leads to the prolonged lifetime of the auxiliary light 8.

Also, because the two-dimensional code reading device 2 in Embodiment 1 uses a taken image of the two-dimensional code to determine whether to turn on or off the auxiliary light 8, no approach sensor is needed and the manufacturing cost can be reduced. Further, maintenance of the approach sensor is eliminated.

Embodiment 2

A two-dimensional code reading device 2 in Embodiment 2 is characterized, in a case when the auxiliary light controller 7 turns on the auxiliary light 8, by making the camera 1 disable the automatic control of the exposure time and the gain to take an image of the two-dimensional code again using the predetermined fixed values of the exposure time and the gain. The fixed values are the values of exposure time and gain which are right for the camera 1 to take an image of the two-dimensional code printed on the ticket medium while the auxiliary light 8 is on.

Figure 6:
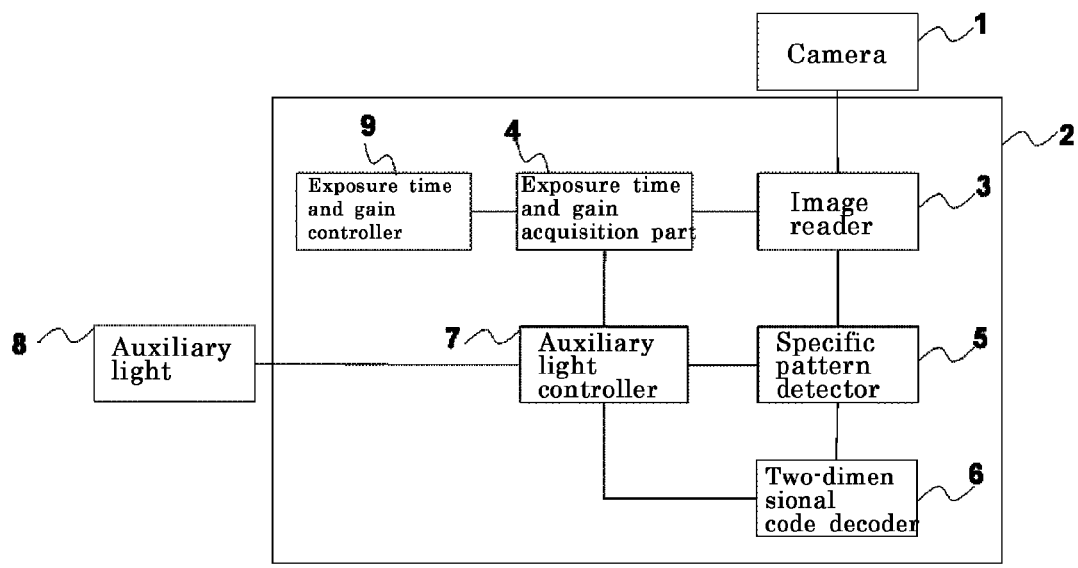
FIG. 6 is a diagram which shows a configuration of a two-dimensional code reading device in Embodiment 2.
Figure 7:
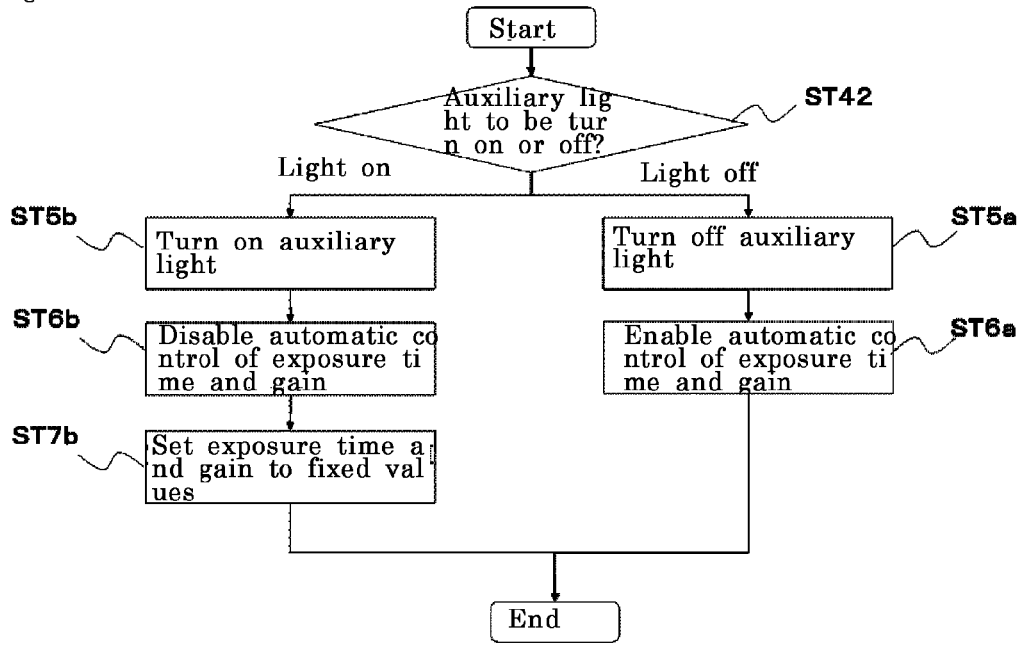
FIG. 7 is a flowchart which shows the operation of the two-dimensional code reading device in Embodiment 2.

Hereinafter, the two-dimensional code reading device 2 in Embodiment 2 will be explained using FIG. 6 and FIG. 7. FIG. 6 is a diagram which shows a configuration of the two-dimensional code reading device 2 in Embodiment 2. FIG. 7 is a flowchart which shows the operation of the two-dimensional code reading device 2 in Embodiment 2. Also, in explaining FIG. 6, the portions equivalent to components of the two-dimensional code reading device 2 in Embodiment 1 are assigned the same symbols as used in FIG. 1 through FIG. 3, on which the explanation will be omitted.

The two-dimensional code reading device 2 in Embodiment 2 includes an exposure time and gain controller 9.

The exposure time and gain controller 9 instructs whether to enable or disable the automatic control for the exposure time and the gain of the camera 1 as well as to set the fixed values for the exposure time and the gain. In ST5b (FIG. 3) of Embodiment 1, when an image of the two-dimensional code is taken again by the camera 1 with the auxiliary light 8 turned on, the illuminance of the reading surface of the ticket medium changes sharply. In such a case, the camera 1 needs longer time to adjust the exposure time and the gain again.

When the auxiliary light 8 is turned on in ST5b, the exposure time and gain controller 9 disables the automatic control of the camera 1, and sets the predetermined fixed values for the exposure time and the gain to the camera 1.

As explained above, by setting the predetermined fixed values to the camera 1, the time required for the automatic control can be reduced, and the information of the two-dimensional code can be read instantly.

Next, using FIG. 7, the operation of the two-dimensional code reading device 2 in Embodiment 2 will be explained. In explaining FIG. 7, the portions equivalent to operations of the two-dimensional code reading device 2 in Embodiment 1 are assigned the same symbols as used in FIG. 5, on which the detailed explanation will be omitted.

In ST42, the auxiliary light controller 7 determines whether to turn on or off the auxiliary light 8 in accordance with the procedures explained in FIG. 5. When the auxiliary light controller 7 has determined to turn on the auxiliary light 8, it turns on the auxiliary light 8 (ST5b). The auxiliary light controller 7 outputs a turn-on instruction to the exposure time and gain controller 9.

In ST6b, when receiving the turn-on instruction for the auxiliary light 8, the exposure time and gain controller 9 requests the image reading unit 3 to stop the automatic control of the camera 1 for exposure time and gain.

In ST7b, the exposure time and gain controller 9 requests the image reading unit 3 to set the fixed values for the exposure time and the gain.

Upon request from the exposure time and gain controller 9, the image reading unit 3 disables the automatic control of the camera 1 for exposure time and gain, in short stops the automatic control, and sets the predetermined fixed values of exposure time and gain right for reading the two-dimensional code while the auxiliary light 8 is on.

Successively, the camera 1 takes an image of the two-dimensional code with the exposure time and the gain indicated by the fixed values. Through this operation, the camera 1 can read the information of the two-dimensional code immediately after the auxiliary light 8 is turned on. After the camera 1 takes an image of the two-dimensional code, the two-dimensional code reading device 2 sequentially executes the detection of a specific pattern by the specific pattern detector 5 and the reading of the information recorded in the two-dimensional code by the two-dimensional code decoder 6, and then ends its operation.

On the other hand, when the auxiliary light controller 7 has determined to turn off the auxiliary light 8 in ST42, the auxiliary light 8 is turned off (ST5a) and the information indicating that the auxiliary light 8 is turned off is outputted to the exposure time and gain controller 9.

In ST6a, when receiving a turn-off instruction of the auxiliary light 8, the exposure time and gain controller 9 requests the image reading unit 3 to start the automatic control of the camera 1 for exposure time and gain.

Upon request from the exposure time and gain controller 9, the image reading unit 3 makes the camera 1 start the automatic control for exposure time and gain. Through this operation, after the auxiliary light 8 is turned off, the exposure time and the gain will become right for the surrounding illuminance to be ready for the next reading of the two-dimensional code.

As explained above, because the camera 1 takes an image of the two-dimensional code in accordance with the predetermined fixed values of the exposure time and the gain when the auxiliary light 8 is turned on, the two-dimensional code reading device 2 in Embodiment 2 can reduce the time required for the automatic control.

Also, when the auxiliary light 8 is turned off, the two-dimensional code reading device 2 in the present embodiment enables the automatic control of the camera 1 for exposure time and gain, thereby immediately getting ready for the next reading of the two-dimensional code.

Through this operation, in accordance with on or off of the auxiliary light 8, the speed of reading the two-dimensional code can be increased.

DESCRIPTION OF REFERENCE NUMERALS

1: camera, 2: two-dimensional code reading device, 3: image reading unit, 4: exposure time and gain acquisition unit, 5: specific pattern detector, 6: two-dimensional code decoder, 7: auxiliary light controller, 8: auxiliary light, 9: exposure time and gain controller, 100: card reader, 101: glass window

The invention claimed is:

1. A two-dimensional code reading device comprising:
an image reading unit to acquire an image of a two-dimensional code printed on a ticket medium;
a specific pattern detector to detect a specific pattern to identify the two-dimensional code from the image of the two-dimensional code acquired by the image reading unit;
a two-dimensional code decoder to read information recorded in the two-dimensional code detected by the specific pattern detector;
an auxiliary light to irradiate light on the ticket medium; and
an auxiliary light controller to control turning on and off of the auxiliary light,
wherein the auxiliary light controller turns on the auxiliary light when the specific pattern is detected by the specific pattern detector and the information recorded in the two-dimensional code cannot be read by the two-dimensional code decoder,
the image of the two-dimensional code acquired by the image reading unit is an image taken by a camera which adjusts the brightness of the image by automatically controlling an exposure time or a gain,
and the auxiliary light controller does not turn on the auxiliary light regardless of a detection result of the specific pattern detector and a reading result of the two-dimensional code decoder, when the exposure time with which the camera takes the image is shorter than a predetermined threshold value of the exposure time, or when the gain with which the camera takes the image is smaller than a predetermined threshold value of the gain.

2. The two-dimensional code reading device according to claim 1, further comprising an exposure time and gain controller to disable, when the auxiliary light controller turns on the auxiliary light, the automatic control of the camera for the exposure time and the gain, to set the camera to use predetermined fixed values on the exposure time and the gain, to make the camera control the exposure time and the gain in accordance with the fixed values, and to make the camera take an image of the two-dimensional code again.

* * * * *